(12) United States Patent
Smirnov et al.

(10) Patent No.: US 8,321,060 B2
(45) Date of Patent: Nov. 27, 2012

(54) METHOD AND SYSTEM OF ON-TOOL AND ON-SITE MFC OPTIMIZATION PROVIDING CONSISTENT RESPONSE

(75) Inventors: Alexei V. Smirnov, Fort Collins, CO (US); Arun Nafarajan, San Bruno, CA (US)

(73) Assignee: Hitachi Metals, Ltd, Tokyo (JP)

( * ) Notice: Subject to any disclaimer, the term of this patent is extended or adjusted under 35 U.S.C. 154(b) by 417 days.

(21) Appl. No.: 12/768,583

(22) Filed: Apr. 27, 2010

(65) Prior Publication Data
US 2011/0264281 A1    Oct. 27, 2011

(51) Int. Cl.
*G05D 7/00* (2006.01)
(52) U.S. Cl. .......................... 700/282; 702/50
(58) Field of Classification Search .......... 700/282; 702/50
See application file for complete search history.

(56) References Cited

U.S. PATENT DOCUMENTS

| | | | |
|---|---|---|---|
| 6,439,254 B1 * | 8/2002 | Huang et al. | 137/10 |
| 6,782,906 B2 * | 8/2004 | Chang | 137/10 |
| 6,848,470 B2 * | 2/2005 | Ohmi et al. | 137/487.5 |
| 2002/0189681 A1 * | 12/2002 | Linthorst | 137/487.5 |
| 2002/0198668 A1 * | 12/2002 | Lull et al. | 702/45 |
| 2007/0233412 A1 * | 10/2007 | Gotoh et al. | 702/100 |
| 2009/0078055 A1 * | 3/2009 | Lull et al. | 73/861 |
| 2010/0036534 A1 | 2/2010 | Ding | |

* cited by examiner

*Primary Examiner* — Ryan Jarrett
(74) *Attorney, Agent, or Firm* — Neugeboren O'Dowd PC (57) ABSTRACT

One method of obtaining an initial adjusted mass flow controller valve start position comprises obtaining a mass flow controller delay period and setting a mass flow controller valve to an initial valve opening position that is less than an expected optimal valve opening position. An initial desired flow rate and initial operating conditions are input into a control system that is in communication with the valve, and the control system is initiated. The control system is adapted to adjust the valve opening position to achieve the initial desired flow rate, while taking into account flow rate and valve position feedback to the control system. During operation of the MFC and control system, the valve position and the flow rate are recorded in one embodiment and a flow rate that one of meets and exceeds a threshold is detected. An initial-flow time-period extending from the time of control system initiation to detection of the threshold being one of met and exceeded is determined and the mass flow controller delay period from the initial flow time period is subtracted from the initial-flow time-period to obtain an adjusted start time. The valve opening position at the adjusted start time is set as the initial adjusted mass flow controller valve start position.

21 Claims, 11 Drawing Sheets

METHOD AND SYSTEM OF ON-TOOL AND
ON-SITE MFC OPTIMIZATION PROVIDING
CONSISTENT RESPONSE

FIELD OF THE INVENTION

The present invention relates generally to mass flow controllers. In particular, but not by way of limitation, the present invention relates to methods and systems for optimizing a mass flow controller across gas types and operating conditions.

BACKGROUND OF THE INVENTION

Mass flow controllers (MFCs) having a quick-response (also known as fast-response) mode are currently used in many applications in the semiconductor and other industries. Applications in these industries not only require MFC modes that operate quickly, but the applications also require that the MFCs limit overshoot of a desired mass flow rate. Furthermore, MFC quick-response modes need to provide consistent responses across varying flow conditions throughout various steps of the MFC process. For example, it would be beneficial in certain applications that MFCs produce quick and accurate flow rates across varying pressures for various setpoints and across multiple gases for multi-gas applications.

Most mass flow controllers are currently calibrated at the manufacturer using $N_2$ gas. Therefore, MFC performance is currently guaranteed only for $N_2$, and MFC performance may significantly degrade when the MFC is used with other gases. Calibrating MFCs with each specific operating gas is not possible due to the high cost of doing so. Furthermore, it may not be possible to calibrate a MFC for many gases due to the gas properties. For example, some gases may be toxic or highly flammable. Also, calibrating a MFC with a "surrogate" gas having properties similar to the operating gas properties, but without the unwanted gas properties may not be possible or effective for many gas types.

SUMMARY OF THE INVENTION

Several embodiments of the proposed invention provide a consistent and more optimal response from the MFC across multiple operating gases and operating conditions such as, but not limited to, multiple desired flow rates and pressures. One embodiment comprises performing one or more calibration runs on the MFC to ensure a quicker response time. During the one or more runs, the MFC collects required information, calculates optimal tuning parameters for each step of the process, and saves optimal parameters into a MFC memory. Then, during operation, optimal tuning parameters may be retrieved from the MFC memory as needed and used for MFC operation to provide a more consistent and accurate response. One method is adapted for use with a quick or fast-response MFC mode.

One method comprises performing a MFC optimization run to obtain an initial adjusted mass flow controller valve start position that decreases MFC delay and eliminates or reduces overshoot. The initial adjusted MFC valve start position may comprise an initial valve setting for a particular gas and operating conditions. Multiple adjusted mass flow controller valve start positions may be obtained and saved to the MFC for each gas and/or operating condition in the application process.

One method may comprise first obtaining a mass flow controller delay period from the manufacturer. The MFC delay period comprises period of time extending from when the MFC process is initiated to when fluid flow begins within the MFC. The MFC delay period is an inherent property of the MFC and is dependent upon portions of the MFC itself such as, but not limited to, delays in the software/firmware, electrical and mechanical components. The MFC valve may then be set to an initial valve opening position that is less than a typical initial valve opening position. For example, the MFC valve may be set to a closed position. An initial desired flow rate and operating conditions may then be input to a control system in communication with the MFC. The control system may then be initiated, adjusting the valve according to the desired flow rate and feedback received from the MFC.

During this calibration run, the position of the valve and the corresponding flow rate through the MFC are recorded in a MFC memory. When the flow rate one of meets and exceeds a threshold, an "initial-flow time-period" is calculated, the initial-flow time-period extends from when the control system is initiated to when the control system detects that the threshold has been met; for example, when flow has begun in the MFC. The MFC delay period (which may be obtained from the manufacturer) is then subtracted from the initial-flow time-period to obtain an adjusted start time. The position of the valve at the adjusted start time is then determined from the recorded data. This valve position is then established as the optimal valve start position for the operating conditions and gas tested. When multiple operating conditions and/or gases may be used in a single application, multiple valve start positions may be determined using a similar procedure for each gas/operating condition.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

FIG. 3' is a graph showing various flow rates for the MFC of FIG. 3, but with optimized tuning, according to one embodiment of the invention.

FIG. 4' is a graph showing the MFC valve position over time for 34%-46% valve start positions.

FIG. 5' is a graph showing MFC flow as a function of time for the MFC valve position of 34%-46% of FIG. 4'.

DETAILED DESCRIPTION

Figure 1:
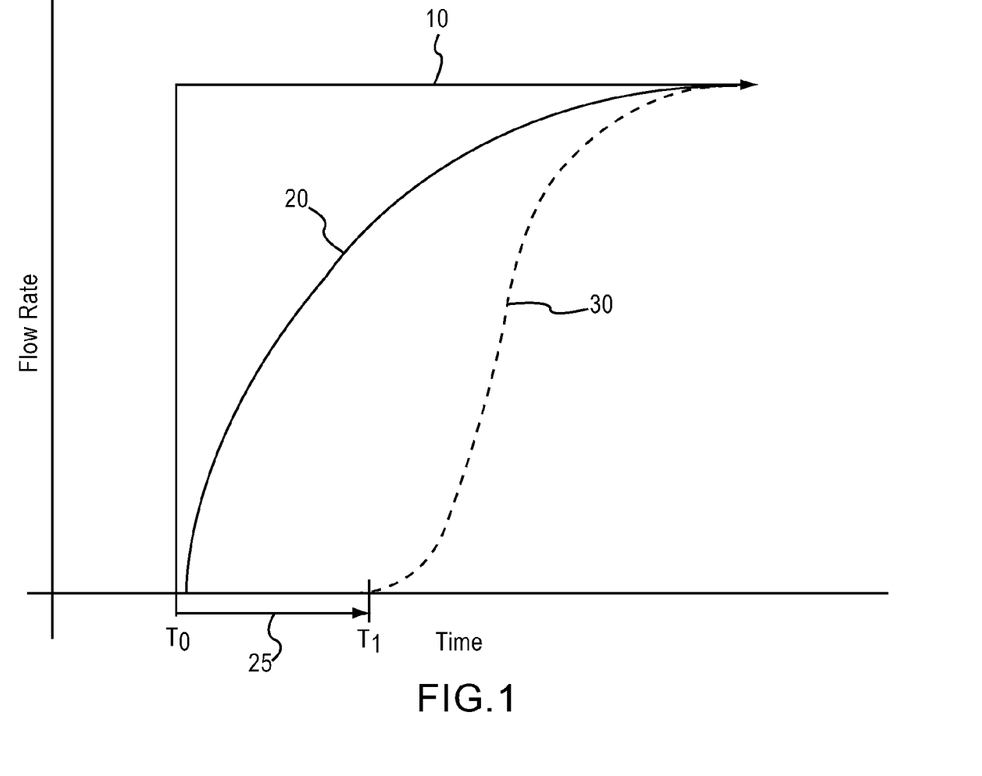
FIG. 1 is a graph showing the desired flow rate, expected flow rate, and actual flow rate of a typical MFC.

Seen in FIG. 1 is a graph displaying the difference between a desired mass flow rate 10, also known as a setpoint or a desired flow rate setpoint, an expected mass flow rate 20, also known as an expected flow rate transient, and an actual mass flow rate 30, or actual flow rate transient. At time $T_0$, a desired flow rate setpoint value is given to a MFC. For example, the setpoint may be entered into a MFC control system. Upon initiation of the MFC such as, but not limited to, a control system comprising a quick-response MFC mode, and in response to the desired flow rate setpoint value being entered into the MFC control system, among other operating conditions, the control system is adapted to change the flow rate over time from the original flow rate, at $T_0$, to the desired flow rate setpoint 10 along the expected flow rate transient 20 seen in FIG. 1. However, the actual flow rate through a MFC is not equal to the expected flow rate transient 20, but resembles the actual flow rate transient 30 seen in FIG. 1.

Figure 2:
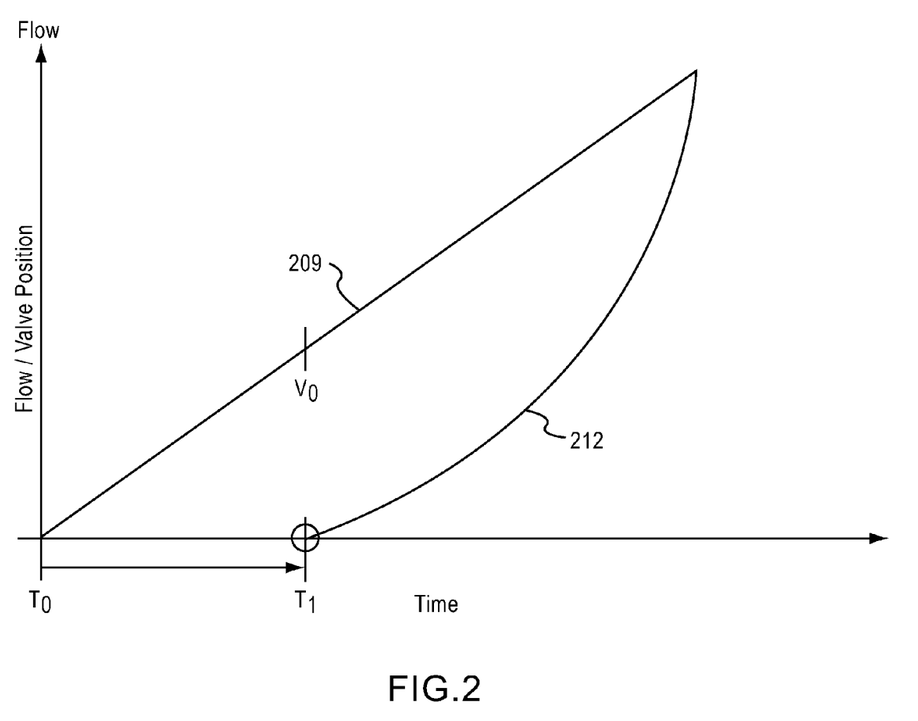
FIG. 2 is a graph displaying the flow rate and valve position as a function of time in a typical MFC.

The difference between the actual flow rate transient 30 and the expected flow rate transient 20 is due, at least in part, to a MFC delay period. For example, as seen in FIG. 2, upon receiving the desired flow rate setpoint at time $T_0$, the valve begins to open, as seen in the valve opening graph 209, but it is not until time $T_1$ when the valve has reached a specific opening position, $V_0$, that fluid flows through the MFC, as seen in the flow rate graph 212. Therefore, time $T_1$ is dependent upon valve Position $V_0$. That is, when valve position $V_0$ is reached, time T1 is reached shortly or nearly immediately thereafter. As seen in FIGS. 1 & 2, there is a delay period 25 between when the setpoint 10 is given and the control system is initiated at $T_0$, and when flow begins in the MFC, at $T_1$.

Figure 3:
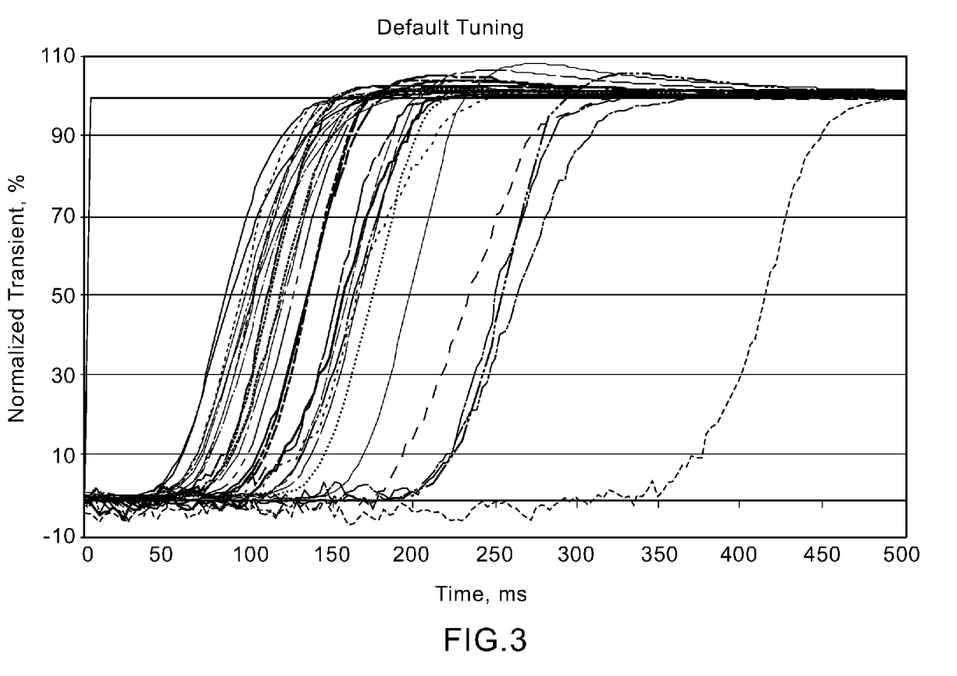
FIG. 3 is a graph showing various flow rates for a MFC having default (manufacturer) tuning.

Seen in FIG. 3 is a graph displaying the actual flow rates as a function of time for a typical MFC with default (manufacturing) tuning, operating in a "fast response" mode. Flow rates are displayed for three gases ($N_2$, $SF_6$, $C_4F_8$) across three different pressures (17 psi, 32 psi, 62 psi), and 4 different setpoints (0-5%, 0-20%, 0-50%, 0-100%). All flow rates are normalized to 0-100%, regardless of the setpoint. Though the flow rate overshoot of the setpoint may be acceptable in some applications, the inconsistent response delay is likely not acceptable. The default tuning may comprise a default valve start position. In one embodiment, the initial valve opening position may be less than the default valve start position such as, but not limited to, a 10% decrease in valve start positions. Other start positions are contemplated.

FIG. 3' shows the actual flow rate as a function of time for the MFC of FIG. 3 with improved tuning using embodiments of the invention as described herein. In order to decrease the inconsistent response delay from FIG. 3 so that the response seen in FIG. 3' is obtained, it is necessary to run the optimization process across each of the operation conditions and gases seen in FIG. 3 to obtain the optimal valve start position for each gas and operating conditions. The valve start position is defined in one embodiment as the percentage of the maximum valve opening position that the valve is set to upon initiation of the MFC application. Such a start position may minimize or eliminate the delay period 25. For example, using an optimal valve start position may decrease the delay period 25 such that the delay period 25 only comprises the delay inherent within the MFC due to piezoelectric operation, firmware/software, and electrical/mechanical components. Therefore, one embodiment of the present invention comprises a method adapted to obtain a consistent MFC response delay across gas type, pressure, and setpoint, among other operating conditions. To do so, the adjusted start position must be determined across operation conditions and gas types for each application.

Figure 4:
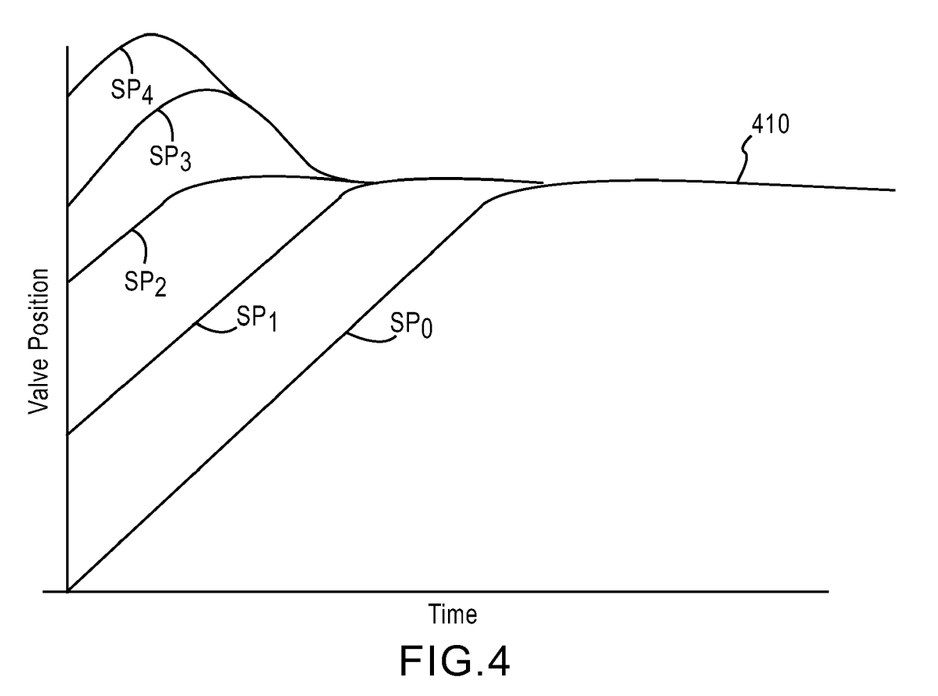
FIG. 4 is a graph showing the MFC valve position over time for various valve start positions.
Figure 5:
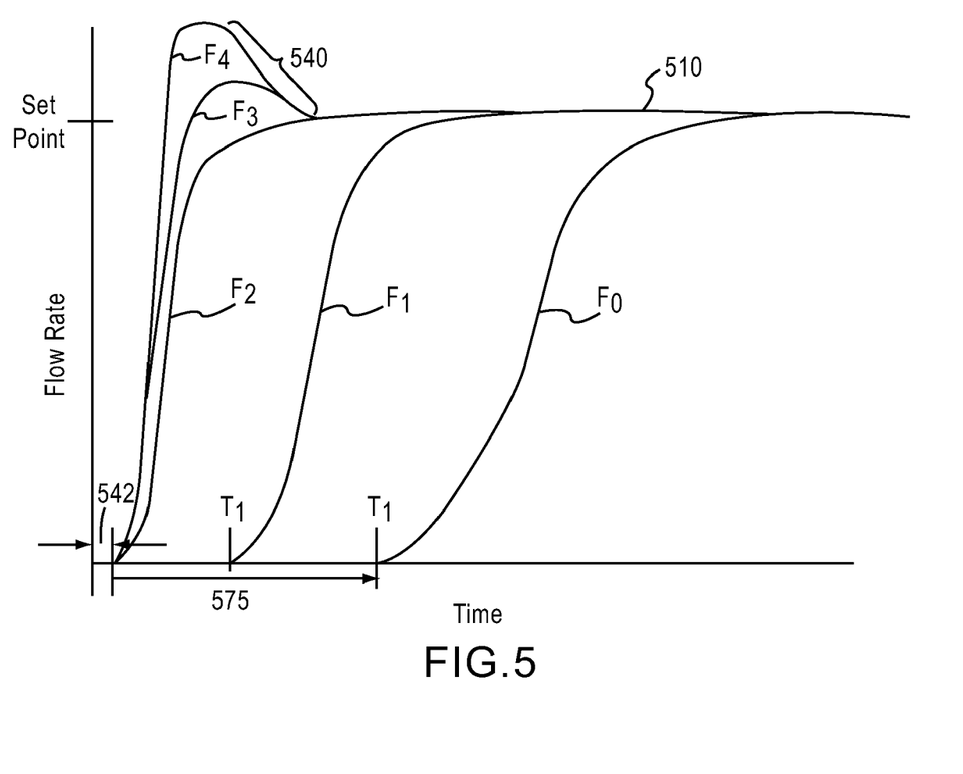
FIG. 5 is a graph showing MFC flow as a function of time for the MFC valve positions of FIG. 4.

To obtain the graphs seen in FIGS. 4-5', the valve should be set to a specified start position prior to each application run. The MFC is then adapted to execute a PID-based closed-loop algorithm, which moves the valve according to the requested setpoint, start position, operating conditions, and the flow sensor feedback. FIGS. 4-5' show how the MFC operates for various selected start positions. If the start position of the valve at the initiation of MFC operation is too small—such as, but not limited to, a zero or closed valve position, the time it takes for flow rate to obtain the setpoint 410 value will be unacceptable for most applications, as seen by set point $SP_0$ and flow $F_0$ in FIGS. 4-5'. However, if the start position is too big (that is, if the valve opening is too large), the flow rate through the MFC may be too big, too quickly, resulting in the flow rate overshooting the setpoint 410, as seen by setpoint $SP_4$ and Flow $F_4$.

FIGS. 4 and 4' show valve positions over time for various valve start positions for a single gas and similar operating conditions. In FIG. 4, $SP_0$ is a valve start position having a small or even closed, valve opening, $SP_1$ is a valve start position where the valve opening is greater than the valve opening at $SP_0$, $SP_2$ is a valve start position wherein the valve opening in $SP_2$ is greater than the valve opening in $SP_1$. Similarly, $SP_3$ is a valve start position where the valve opening is greater than the valve opening in $SP_2$, and $SP_4$ operates similarly. FIG. 4' shows the valve position as a function of time where valve start positions range from 34%-46% of the maximum open valve position and the set point 410' is equal to 50% of the maximum flow rate.

Seen in FIG. 5 are flow rates $F_0$-$F_4$ which correspond to start positions $SP_0$-$SP_4$, respectively. For example, when starting position $SP_0$ is used, the flow rate $F_0$ is obtained. As seen, as the valve start position opening increases from $SP_0$ to $SP_2$, the delay period 525 decreases. However, at some starting positions $SP_3$ and greater, flow rates $F_3$ and greater overshoot 540 the set point 510. Therefore, there is an optimal starting position $SP_n$ that minimizes the delay period 525 and eliminates overshoot 540. One optimal starting position $SP_n$ may comprise the second starting position $SP_2$ seen in FIG. 4. At even the optimal starting position $SP_2$, however, the flow rate $F_2$ may have a MFC delay 542, seen in FIG. 5, caused by the mechanical and electrical properties of the MFC and the control system, as known in the art. Similarly, FIG. 5' is a graph of the flow rates corresponding to the valve start positions seen in FIG. 4'.

As seen in FIGS. 4-5', for the valve start positions $SP_0$-$SP_2$ of FIG. 4 and 34% to 42% range in FIG. 4', the flow traces and valve traces have substantially similar waveforms with substantially similar time intervals between traces. For example, in FIGS. 4' and 5', the time interval is about 10 ms. Additionally, for valve start positions 42% and above, MFC flow starts developing after about a 30 ms MFC delay 542' from the time the control system is initiated. This 30 ms delay is a result of the delays in the control system, electronic circuits, the piezoelectric actuator, or other electromechanical portions of the MFC.

As seen in FIGS. 4' and 5', increasing the start position results in an increased flow slew rate, with overshoot of the setpoint 510' occurring at about a 46% valve start position. Therefore, although the 44% valve start position would appear to be proper choice for a valve start position since it has an increased slew rate over the 34%-42% valve start positions, and does not have an overshoot like the 46% valve start position, the 44% valve start position may be very sensitive to changes in operating conditions. Therefore, the 42% valve start position may comprise an optimal valve start position in one embodiment. Other valve starting positions, depending on the gas and operating conditions, are contemplated.

Figure 6:
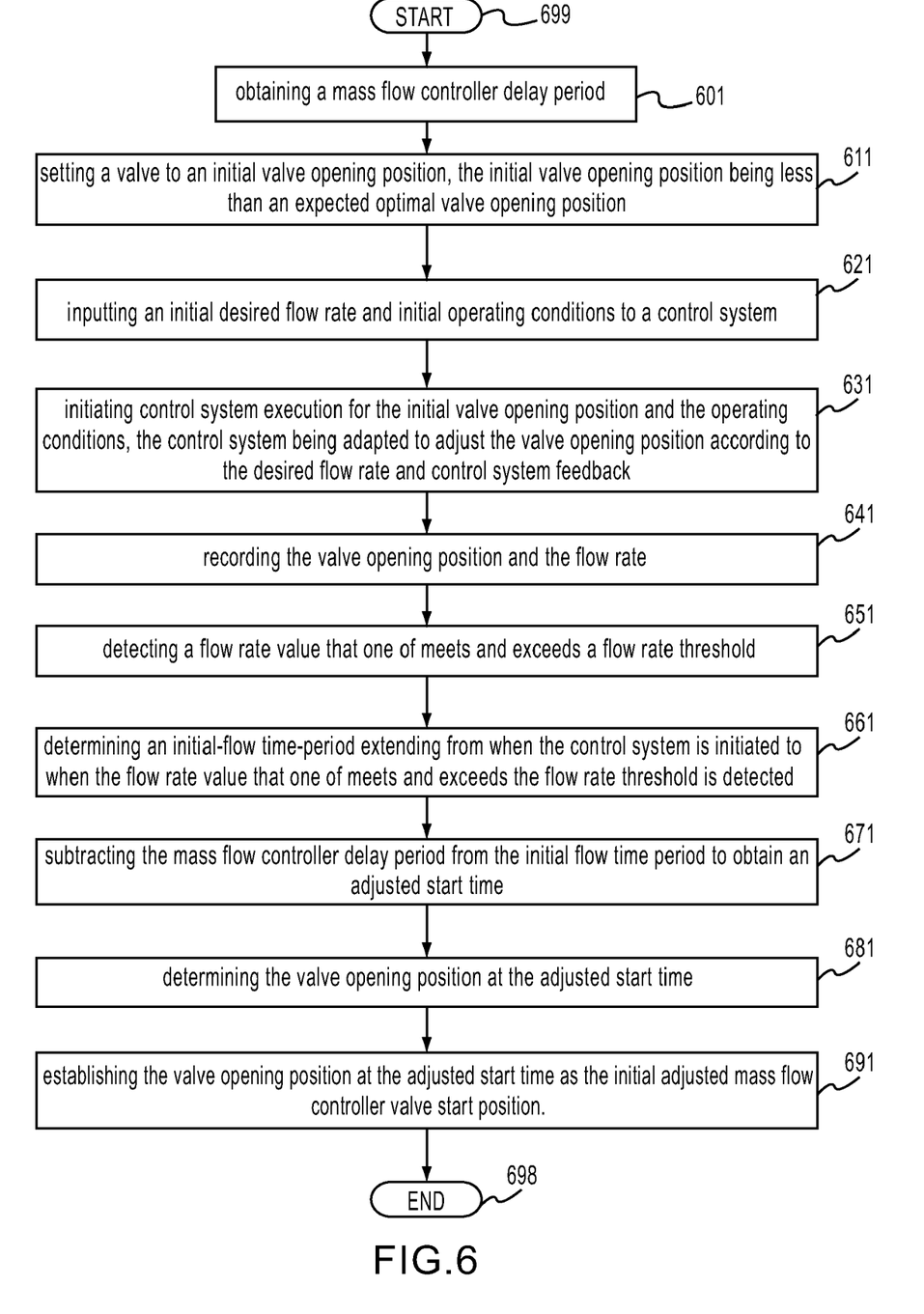
FIG. 6 is a method of obtaining an initial adjusted mass flow controller valve start positing according to embodiment of the invention.

Seen in FIG. 6 is a method of obtaining an initial adjusted mass flow controller valve start position. The method starts at 699 and at 601 comprises obtaining the mass flow controller delay period 542'. The MFC delay period 542' may be obtained by the user through performing tests on a MFC having a manufacturer's tuning such as the tests shown above and outlined in FIGS. 4-5'. Or, a user may obtain the MFC delay period 542' from the manufacturer. The MFC delay period 542' is fixed and is a property of the device. Upon obtaining the MFC delay period 542', at 611, one method comprises setting a MFC valve to an initial valve opening position. One MFC initial valve opening position may comprise a valve opening position that is less than an expected optimal valve opening position. For example, in the FIG. 4' and 5' scenario, the valve may be set to an initial valve opening position of 34% of the maximum opening position of the valve. An initial valve opening position of 0% of the maximum opening valve position (i.e., a closed valve) is also contemplated. Setting the valve to the initial valve opening position may comprise setting the valve position in one of software and firmware.

Figure 7:
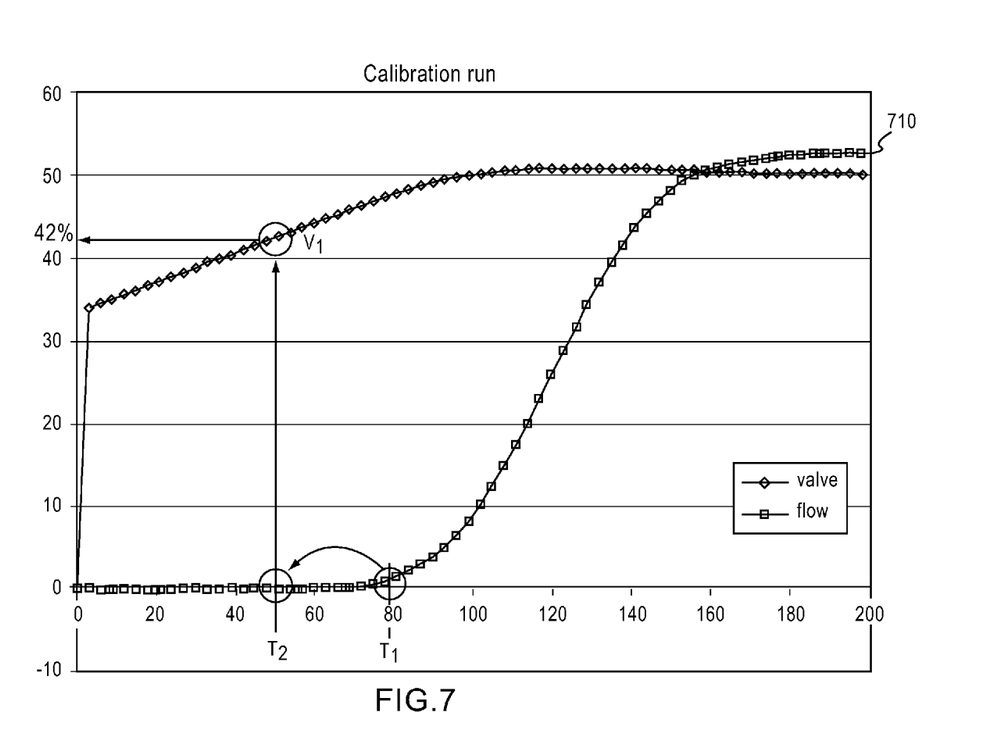
FIG. 7 is a graph showing recorded flow rate and valve position in one embodiment of the invention.

After the initial valve opening position is set, as seen at 631, a typical MFC process may be initiated. For example, an initial desired flow rate and one or more initial flow operating conditions such as, but not limited to, fluid type and pressure, may be entered into a control system in communication with the MFC. One control system is adapted to adjust the valve opening position according to the valve start position and the desired flow rate, based on control system feedback. During one method, at 641, the position of the valve and the flow rate may be recorded or otherwise stored. In other embodiments, this step may not be performed. At 651, a flow rate that one of meets and exceeds a flow rate threshold is detected, at point $T_1$, as seen in FIG. 7. For example, a signal could be raised in the control system when the flow starts developing in the MFC and reaches a flow rate comprising 1% of the setpoint value 710. Other threshold values corresponding to other flow rates are contemplated, as well as other methods known in the art for obtaining an exact time of when gas begins to flow in the MFC, that are known in the art. At 661, an initial-flow time-period is determined. In one method the initial-flow time-period extends from when the control system is initiated to when it is detected that the flow rate one of meets and exceeds the established threshold. In order to determine the optimal valve start position that will decrease both overshoot 540 and delay 525 (as seen in FIG. 5), at 671, the mass flow controller delay period 542' is subtracted from the initial-flow time-period to obtain an adjusted start time, $T_2$, as seen in FIG. 7. Once the adjusted start time $T_2$ is obtained, the adjusted valve opening position $V_1$ that corresponds to the adjusted start time $T_2$ is determined. For example, as seen in FIG. 7, the adjusted valve opening position comprises a valve having an opening that is 42% of the maximum valve opening. This adjusted valve opening position is established as the initial adjusted mass flow controller valve start position for that gas and operating conditions. Initial adjusted mass flow controller valve start positions may comprise between 25% to 50% of the maximum valve opening in some embodiments and may comprise between 41% and 44% in other embodiments. The method of FIG. 6 ends at 698.

Figure 9:
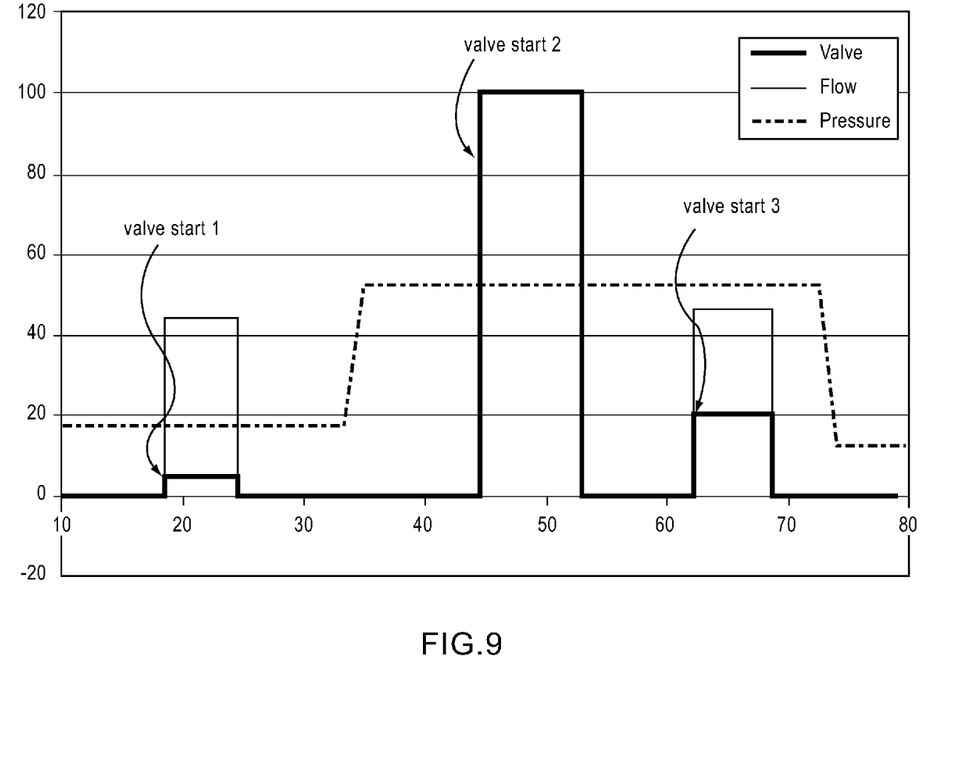
FIG. 9 shows the valve position, flow rate, and pressure for one application according to one embodiment of the invention.

Embodiments may also comprise obtaining additional adjusted mass flow controller valve start positions for a single application/process. For example, seen in FIG. 9 is a typical MFC process having several steps across multiple pressures and flow rates. Therefore, an initial adjusted mass flow controller valve start position should be calculated for each step that includes a change from a zero flow rate to a non-zero flow rate. The example of FIG. 9 comprises the following initial adjusted mass flow controller valve start positions for each of the following pressures: 5%, 17 psi; 100%, 52 psi, and 20%, 52 psi. The method of obtaining the additional adjusted mass flow controller valve start positions were the same as the method described above to obtain the initial adjusted mass flow controller valve start position seen in FIG. 7.

Figure 8:
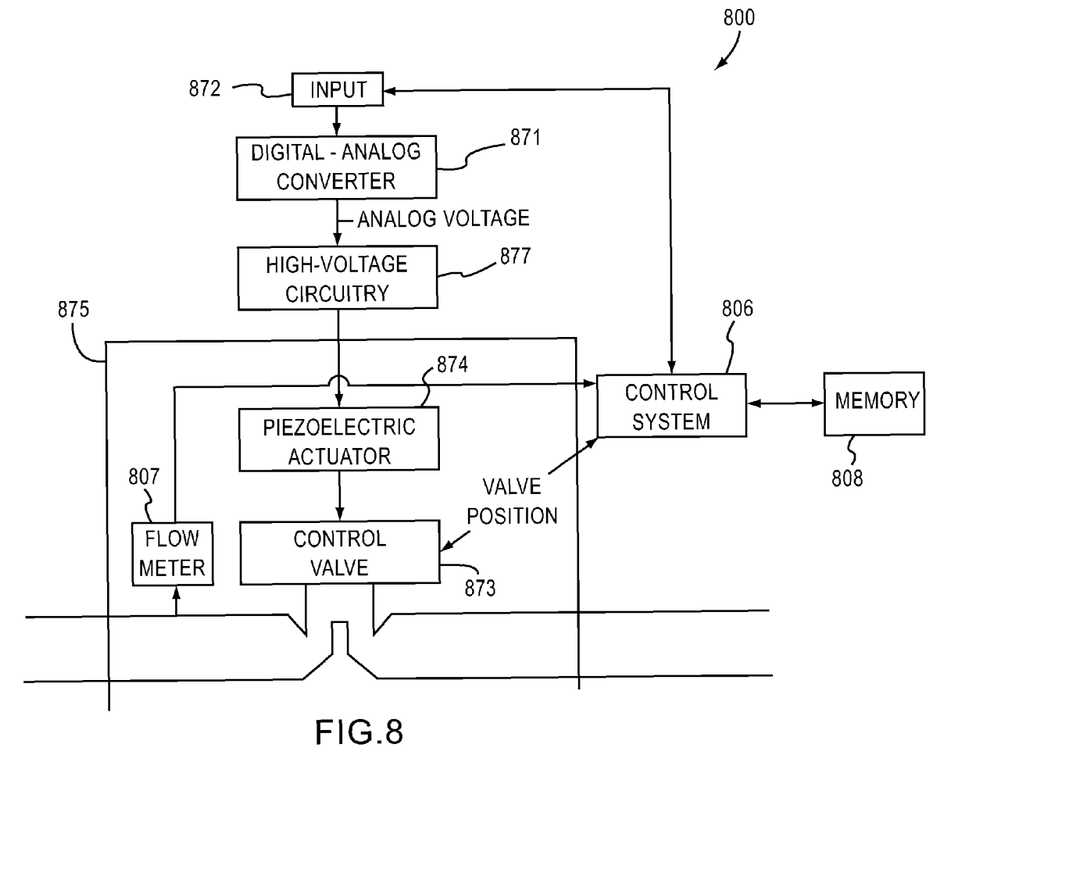
FIG. 8 is a system comprising a mass flow controller and a control system according to one embodiment of the invention.

In one embodiment, the additional valve start positions and corresponding operating conditions and gas types are stored in a memory 808, as seen in FIG. 8. These initial and additional adjusted mass flow controller valve start positions, gas types, and operating conditions may then be used in the future in similar applications, or may be used to obtain one or more additional adjusted mass flow controller valve start positions, possibly through extrapolation or interpolation.

One or more embodiments of the present invention may also comprise signaling a MFC fault condition. For example, if an optimization process as described herein is newly performed for a gas and operating conditions that was previously performed and for which the data is stored in the MFC memory, the new adjusted mass flow controller valve start position may be compared to the adjusted mass flow controller valve start position that is stored in the MFC memory for the similar conditions. If the new adjusted mass flow controller valve start position is different than the old one, then the MFC may provide a signal that there may be a problem with the MFC such as, but not limited to, a MFC hardware problem.

Additionally, one method may comprise an automatic valve start position adjustment process that may one of increase the adjusted mass flow controller valve start position and decrease adjusted mass flow controller valve start position. In one such method, the control system may log valve position and flow rate, similar to FIG. 7, for each transition from a zero to a non-zero setpoint, similar to FIG. 9. Such data may be stored in the MFC memory 808, as seen in FIG. 8. The MFC then detects the moment at which flow beings through the MFC, such as, but not limited to, using a flow meter 807 to detect flow. At such a point, firmware, software, or hardware within the control system 806 or other location in the MFC 875 is adapted to compare the delay period from when the MFC application was initiated to when flow developed and compare the delay period to a known delay period for similar operating conditions, such as, but not limited to, the delay period 542' seen in FIG. 5. One delay period 542' may comprise a delay period from 10 ms to 30 ms. Upon comparing the two delay periods, if the control system 806 or other MFC 875 component determines that the new delay period is longer than the original delay period 542' and therefore flow started later during the new delay period than started during the original delay period, then the adjusted mass flow controller valve start position may be increased by a predefined amount. For example, the adjusted mass flow controller valve start position may be increased by 1% in one embodiment, such as, but not limited to, from the 42% start position seen in FIG. 4' to a 43% start position. Alternatively, a new adjusted mass flow controller valve start position may be determined. For example, the mass flow controller delay period 542' may be subtracted from the newly obtained delay period, the valve position may be found at that time, and, similar to FIG. 7, the valve position at that time may be assigned the new adjusted mass flow controller valve start position.

If flow is found to start on or close to a known MFC delay period 542', and overshoot occurs, the adjusted mass flow controller valve start position may be decreased by a specified amount, such as, but no limited to, 1%. If no overshoot occurs, the existing adjusted mass flow controller valve start position may be kept.

Seen in FIG. 8 is one embodiment of a system 800 comprising a mass flow controller 875 and a control system 806 in communication with the mass flow controller 875. Although only the piezoelectric actuator 874 and the control valve 873 are shown as being included in the MFC 875 in FIG. 8, one or more of the other items listed in FIG. 8 may also be included in the MFC. For example, the MFC may include the control system 806, memory, 808, and flow meter 807. As seen in FIG. 8, input 872 such as, but not limited to, gas type, pressure, and setpoint may be entered into the system 800. The digital-analog converter 871 may convert the input to an analog voltage which may be sent to a high-voltage circuitry 877 that is adapted to operate the piezoelectric actuator 874. The MFC delay 542' may be comprised of one or more of delays within the (i) software and/or firmware, (ii) the control system 806, (iii) input 872, (iv) high voltage circuitry 877, (v) piezoelectric actuator 874, and (vi) valve 873.

Additionally, in one embodiment of the system 800 of FIG. 8, a user of the system 800 may select an optimization mode. The optimization mode may be comprised of software, firmware, and/or hardware and may be included in the control system 806. Upon selection of an optimization mode, the MFC 875 may be adapted to obtain one or more adjusted mass flow controller valve start positions for specific operating conditions entered into the system. The optimization mode may be available for the quick-response mode of the MFC. Upon obtaining the one or more adjusted MFC start positions, the optimization mode may additionally run the desired MFC application

What is claimed is:

1. A method of obtaining an initial adjusted mass flow controller valve start position comprising,
    obtaining a mass flow controller delay period comprising a period of time between initiation of a mass flow controller application and initiation of flow through the mass flow controller;
    setting a valve to an initial valve opening position;
    inputting an initial desired flow rate and initial operating conditions into a control system in communication with the valve;
    initiating control system execution for the initial valve opening position and the initial operating conditions, the control system being adapted to adjust the valve opening position according to the initial desired flow rate and control system feedback;
    recording the valve position and the flow rate during at least a portion of the control system execution;
    detecting a flow rate that one of meets and exceeds a threshold;
    determining an initial-flow time-period extending from the control system initiation execution to detection of the threshold being one of met and exceeded;
    subtracting the mass flow controller delay period from the initial flow time period to obtain an adjusted start time;
    determining the valve opening position at the adjusted start time; and
    establishing the valve opening position at the adjusted start time as the initial adjusted mass flow controller valve start position so as to enable at least one of quicker flow and decreased desired flow rate overshoot.

2. The method of claim 1, wherein the initial valve opening position comprises a closed valve.

3. The method of claim 1, wherein the initial valve opening position comprises a valve having an opening no greater than 10% of the maximum valve opening.

4. The method of claim 1 wherein, the initial adjusted mass flow controller valve start position comprises a valve opening between 10% and 50% of the maximum valve opening.

5. The method of claim 1, wherein the initial valve opening position comprises a valve opening at least 10% less than a default valve start position.

6. The method of claim 1 further comprising obtaining additional adjusted mass flow controller valve start positions comprising,
    setting a valve to one or more additional initial valve opening positions, the one or more additional initial valve opening positions being less than one or more additional expected optimal valve opening positions;
    inputting one or more additional desired flow rates and one or more additional operating conditions to the control system;
    initiating one or more additional control system executions for the one or more additional valve opening positions and the one or more additional operating conditions, the control system being adapted to adjust the valve opening position according to the one or more desired flow rates and control system feedback;
    recording the valve position and the flow rate during at least a portion of the one or more additional control system executions;
    detecting one or more additional flow rate that one of meet and exceed the threshold;
    determining one or more additional initial-flow time-periods extending from the control system initiations to the one or more detections of the threshold being one of met and exceeded;
    subtracting the mass flow controller delay period from the one or more additional initial-flow time-periods to obtain one or more additional adjusted start times;
    determining one or more additional valve opening positions at the one or more additional adjusted start times; and
    establishing the one or more additional valve opening positions at the one or more adjusted start times as the one or more additional adjusted mass flow controller valve start positions.

7. The method of claim 6 further comprising, storing the initial adjusted mass flow controller valve start position and the one or more additional adjusted mass flow controller valve start positions in a mass flow controller memory.

8. The method of claim 6 further comprising, using the initial adjusted mass flow controller valve start position and the one or more additional adjusted mass flow controller valve start positions to determine further additional valve start positions for further additional initial valve opening positions, flow rates and operating conditions.

9. The method of claim 8 wherein at least one of interpolation and extrapolation is used to determine the further additional valve start positions.

10. The method of claim 6 wherein, one of the one or more additional desired flow rates comprises the initial desired flow rate and one of the one or more additional operating conditions comprises the initial operating condition.

11. The method of claim 10 further comprising,
    comparing the initial adjusted mass flow controller valve start position to one of the one or more additional adjusted mass flow controller valve start positions; and
    signaling a mass flow controller fault condition if there is a difference between the initial adjusted mass flow controller valve start position and the one of the one or more additional adjusted mass flow controller valve start positions.

12. The method of claim 6 further comprising, initiating a mass flow controller application where one or more of the initial adjusted mass flow controller valve start positions and the one or more additional adjusted mass flow controller valve start positions are used as valve start positions in the application.

13. The method of claim 6 wherein the initial adjusted mass flow controller valve start position and the one or more additional adjusted mass flow controller valve start positions comprise start positions for individual gas types.

14. The method of claim 1 further comprising, automatically adjusting the initial adjusted mass flow controller valve start position based on the control system feedback.

15. The method of claim 14 wherein, the automatically adjusting the initial adjusted mass flow controller valve start position comprises one of,
   increasing the valve opening position to decrease the adjusted start time; and
   decreasing the valve opening position to decrease overshoot of the initial desired flow rate.

16. The method of claim 14 wherein, automatically adjusting the initial adjusted mass flow controller valve start position comprises,
   logging valve position and flow rate during a flow rate transition from a zero flow rate to a nonzero setpoint during a mass flow controller fast-response mode;
   detecting when flow starts developing,
      when flow starts developing later than the mass flow controller delay period, one of,
         increase the adjusted mass flow controller valve start position by a predefined amount, and
         obtain a new adjusted mass flow controller valve start position;
      when flow starts developing one of near and at the mass flow controller delay period, one of,
         decrease the adjusted mass flow controller valve start position by a predefined amount when the flow overshoots the desired flow rate, and
         keep the existing adjusted mass flow controller valve start position when the flow does not overshoot the desired flow rate.

17. A system comprising,
a mass flow controller;
a control system in communication with the mass flow controller, the control system adapted to obtain an initial adjusted mass flow controller valve start position by,
   adjusting the valve opening position according to a desired flow rate and a control system feedback,
   detecting a flow rate that one of meets and exceeds a flow rate threshold,
   determining an initial-flow time-period extending from control system initiation to detection that the threshold has been one of met and exceeded,
   subtracting a mass flow controller delay period from the initial-flow time-period to obtain an adjusted start time, the mass flow controller delay period comprising a period of time between initiation of a mass flow controller application and initiation of flow through the mass flow controller;
   determining the valve position at the adjusted start time, and
   establishing the valve position at the adjusted start time as the initial adjusted mass flow controller valve start position.

18. The system of claim 17 wherein the mass flow controller delay period comprises at least one of,
   at least one of software and firmware delay;
   high voltage converter delay;
   piezoelectric delay; and
   valve response delay.

19. The system of claim 17 further comprising, a selectable optimization mode adapted to obtain one or more initial adjusted mass flow controller valve start positions.

20. The system of claim 17 wherein, a selectable quick-response mode is adapted to use the initial adjusted mass flow controller valve start position.

21. The system of claim 17 wherein, the mass flow controller delay period comprises a delay period from 10 ms to 30 ms.

* * * * *

UNITED STATES PATENT AND TRADEMARK OFFICE
CERTIFICATE OF CORRECTION

PATENT NO. : 8,321,060 B2
APPLICATION NO. : 12/768583
DATED : November 27, 2012
INVENTOR(S) : Smirnov et al.

It is certified that error appears in the above-identified patent and that said Letters Patent is hereby corrected as shown below:

Title Page Inventors item (75) in the first column of the first page of the Patent document, the second Inventor's name should be Arun Nagarajan Signed and Sealed this
First Day of January, 2013

David J. Kappos
*Director of the United States Patent and Trademark Office*